UNITED STATES PATENT OFFICE.

WILLIAM S. WELCH AND LITTLETON F. WELCH, OF WESTFIELD, NEW JERSEY.

DISTEMPER-PAINT.

SPECIFICATION forming part of Letters Patent No. 252,558, dated January 17, 1882.

Application filed January 5, 1881. (No specimens.)

*To all whom it may concern:*

Be it known that we, WILLIAM S. WELCH and LITTLETON F. WELCH, of Westfield, in the county of Union and State of New Jersey, have invented certain new and useful Improvements in Distemper-Paints, of which the following is a specification.

The object of this invention is to furnish for calciminers an improved liquid distemper-paint, which is ready for instant use without requiring mixing with water.

Heretofore the materials for distemper paint or calcimine were mixed at the time of use, which not only delayed the work but did not furnish the exact tint desired.

Our invention is designed to furnish the market with packages of calcimining-paint ready for immediate use without the addition of water or other liquid.

The invention consists of a distemper paint or calcimine, consisting of a pigment or pigments, a size, nitrate of soda, chlorate of potash, and boric acid, all mixed with water. The substances are prepared in the following proportions, to wit: Six pounds of paris-white, or any other white or colored pigment, are thoroughly mixed with a sufficient quantity of water. To this liquid paint are added about three pounds of a size consisting of glue, Irish moss, or other vegetable gum or paste, dissolved in hot water, or a mixture of any one or more of them. Finally, a small quantity—about one and one-half ounce—of equal parts of nitrate of soda, chlorate of potash, and boric acid, is dissolved in warm water, and added to one gallon of the mixture. The whole is thoroughly mixed and packed for sale in barrels or cans, so as to be ready for use whenever required. Owing to the presence of the nitrate of soda, chlorate of potash, and boric acid, the paint will keep for any length of time in hot or cold weather without deterioration or fermentation. The paint or calcimine is made up in any desired color, shade, or tint, and sold from sample cards, each shade having a number and name, to which the number and name on the package correspond.

We are aware that it is not new to mix with calcimines substances which act as antiseptics or preservatives, and therefore we do not claim such when broadly considered.

Having thus described our invention, we claim as new and desire to secure by Letters Patent—

The composition of matter to be used as a calcimine, consisting of a watery mixture of paris-white or other pigment, a size, and a solution in water of nitrate of soda, chlorate of potash, and boric acid, substantially as described.

In testimony that we claim the foregoing as our invention we have signed our names, in presence of two witnesses, this 27th day of December, 1880.

WILLIAM S. WELCH.
LITTLETON F. WELCH.

Witnesses:
M. L. WELCH,
E. L. WELCH.